United States Patent [19]

Tufts

[11] Patent Number: 4,997,637
[45] Date of Patent: Mar. 5, 1991

[54] DIGESTIVE CRYSTALLIZING PROCESS AND APPARATUS FOR PURIFICATION OF KCl

[75] Inventor: Lewis E. Tufts, Lewiston, N.Y.

[73] Assignee: Occidental Chemical Corporation, Niagara Falls, N.Y.

[21] Appl. No.: 350,676

[22] Filed: May 9, 1989

[51] Int. Cl.[5] .............................. C01D 3/14; C01D 3/08
[52] U.S. Cl. ...................................... 423/499; 423/184; 423/208; 23/297
[58] Field of Search ............... 423/499, 208, 189, 184; 23/297

[56] References Cited

U.S. PATENT DOCUMENTS

| | | | |
|---|---|---|---|
| 3,419,899 | 12/1968 | Tufts et al. | 23/302 A |
| 3,440,023 | 4/1969 | Hoppe et al. | 23/297 |
| 3,642,454 | 2/1972 | Nylander | 23/297 |
| 4,248,601 | 2/1981 | McGough et al. | 423/499 X |
| 4,303,624 | 12/1981 | Dotson et al. | 423/184 |
| 4,385,902 | 5/1983 | Haugrud | 23/293 R |

FOREIGN PATENT DOCUMENTS

| | | | |
|---|---|---|---|
| 1144737 | 4/1983 | Canada | 423/499 |
| 1125191 | 11/1984 | U.S.S.R. | 423/499 |

Primary Examiner—Jeffrey E. Russel
Assistant Examiner—Brian M. Bolan
Attorney, Agent, or Firm—James F. Tao; Richard D. Fuerle

[57] ABSTRACT

Disclosed is a method of reducing the sodium chloride content of potassium chloride by forming an aqueous slurry of potassium chloride feed crystals having a wide particle size distribution with an average diameter of about 0.1 to about 50 microns in a liquor saturated with potassium chloride and undersaturated with sodium chloride, which is at least 50% saturated with sodium chloride, whereby the smaller of the feed crystals dissolve and potassium chloride grows on the larger of the feed crystals to form product crystals removing the product crystals from the slurry. Also disclosed is an apparatus for carrying out this process.

27 Claims, 1 Drawing Sheet

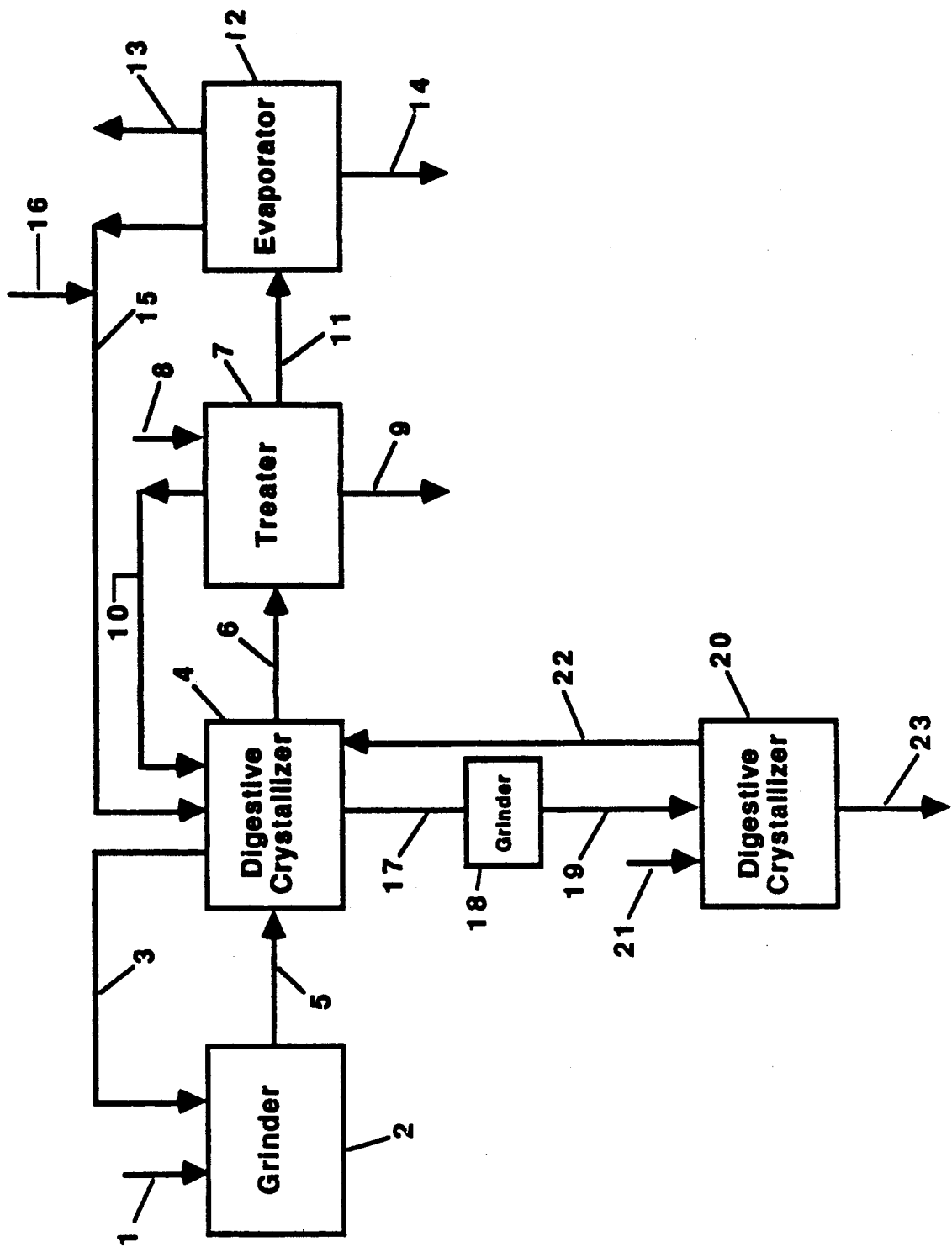

DIGESTIVE CRYSTALLIZING PROCESS AND APPARATUS FOR PURIFICATION OF KCl

BACKGROUND OF THE INVENTION

This invention relates to a method and apparatus for reducing the sodium chloride content of potassium chloride by a digestive crystallizing process. In particular, it relates to such a process where smaller and more impure feed crystals are slurried in an aqueous medium with larger and more pure product crystals so that the feed crystals dissolve and purer potassium chloride grows on the larger product crystals.

Potassium chloride is sold according to the amount of sodium chloride it contains, the most expensive grades typically containing the least sodium chloride. Mine run potassium chloride contains about 60% sodium chloride; agricultural grade contains about 3%; industrial grade contains 1000 to 3000 ppm; and chemical grade contains about 200 ppm. The presence of sodium chloride makes agricultural grade potassium chloride unsuitable for use in many industrial processes. For example, potassium chloride is used in electrolytic cells to produce potassium hydroxide. The presence of excessive concentrations of sodium chloride in the potassium chloride causes contamination of the potassium hydroxide product with sodium hydroxide. This is very undesirable in several important uses for potassium hydroxide.

Industrial grade potassium chloride can presently be made from lower grades of potassium chloride by re-crystallization. (See, for example, U.S. Pat. Nos. 3,644,102 and 3,440,023.) In recrystallization, the low grade potassium chloride is dissolved and water is evaporated to preferentially precipitate potassium chloride while the sodium chloride remains in solution. Although recrystallization is an effective process, a great deal of energy is required to evaporate the water, and therefore it is very costly.

SUMMARY OF THE INVENTION

I have discovered that the sodium chloride content of potassium chloride can be reduced by forming an aqueous slurry of potassium chloride feed crystals having a wide particle size distribution with a weight average diameter of about 0.1 to about 50 microns, in a liquor saturated with potassium chloride and undersaturated with sodium chloride, and containing potassium chloride product crystals that have a lower sodium chloride content than the feed crystals, and that have a weight average diameter of about 10 to about 1000 times greater than the average diameter of the feed crystals. Under these conditions, all the smaller feed crystals dissolve, causing supersaturation of the aqueous phase in potassium chloride relative to the larger crystals. This causes the growth of a purer potassium chloride on the larger product crystals. In this way, the product crystals, when they are removed, are much purer than the feed crystals. A small amount of the potassium chloride in the feed slurry (only the largest crystals) does not dissolve completely but becomes seed crystals which grow to become product crystals.

Because no evaporation is required to form the product potassium chloride, the energy requirements of the process of this invention are much less than for a comparable conventional recrystallization process.

The sodium chloride (averaging about 3% of agricultural grade potassium chloride raw material) is removed from the process by crystallization in a high temperature evaporative crystallizer. This is the only evaporative crystallization in the process. Since the potassium chloride is crystallized in the digestive crystallizer, the large energy requirement in crystallizing potassium chloride in the evaporatively cooled crystallizer normally used in the prior art is avoided. Even the relatively lower energy requirement to remove the sodium chloride is held to a minimum by maintaining the sodium chloride concentration in the aqueous phase in the digestive crystallizer only slightly below saturation.

DESCRIPTION OF INVENTION

The accompanying drawing is a flow diagram illustrating a certain presently preferred embodiment of the process and apparatus according to this invention.

In the drawing, solid potassium chloride in line 1 is admitted to wet grinder 2. The potassium chloride can contain a variety of contaminants including sodium chloride in concentrations up to 10% by weight, but typically it contains about 0.3 to about 5% by weight sodium chloride, with minor impurities such as magnesium chloride, calcium sulfate, and very small particle size insoluble minerals. Preferably, the process is supplied agricultural grade potassium chloride. While the process of this invention can use a compacted potassium chloride, it is preferable to use potassium chloride that is not compacted, avoiding the costs of the compacting operation. Compacting serves no useful purpose in the process of this invention because the particles are ground to a small particle size in the wet grinder 2.

In wet grinder 2, the decanted mother liquor in line 3 from digestive crystallizer 4 is mixed with the solid potassium chloride to form a slurry. While a dry grinder can be used, a wet grinder is preferred because dry grinding creates dust and static electricity which can cause the solids to cling to the grinder, making them difficult to work with. The feed is formed by grinding the solids in the slurry to a particle size of about 0.1 to about 50 microns average diameter. If the solids are ground to a larger particle size, it may result in too many seed crystals in digestive crystallizer 4. ("Seed crystals" are crystals that grow instead of dissolving.) An excessive number of seed crystals may cause the average product crystal size to become too fine to be easily filtered and washed free of mother liquor. Also, if the feed crystals are too large, the resulting degree of potassium chloride supersaturation may be very low causing a severe reduction in the production rate. If the solids are ground too fine, no useful purpose is served and unnecessary energy is consumed. The preferred average diameter of the feed crystals is about 1 to about 25 microns.

In addition, the feed crystals must have a wide particle size distribution because the finer feed crystals dissolve to give supersaturation with potassium chloride resulting in the growth of pure product crystals, while the larger feed crystals provide the new seed crystals. A wide distribution is normally naturally obtained in any grinding process. If the ground feed crystals do not have a distribution of sizes, then either all the crystals in the feed will be too small and will dissolve and there will be no seed crystals present on which growth can occur, or there will be an excessive number of seed crystals resulting in an undesirable reduction in product crystal size.

A further requirement of the feed crystals is that the average diameter of the feed crystals must be 10 to 1000 times smaller than the average diameter of the product crystals. (The "product crystals" are seed crystals on which potassium chloride has grown; the average diameter of the product crystals is typically about 3 to about 100 times the average diameter of the seed crystals.) If the feed crystals are too much smaller than the product crystals, no useful purpose is served and the additional grinding required is wasted. On the other hand, if the feed crystals are too close in size to the product crystals, the average product crystal size will be too fine to be easily filtered and the production rate will fall.

The slurry from grinder 2 is passed through line 5 to digestive crystallizer 4. In digestive crystallizer 4, all but the coarsest potassium chloride particles in the feed dissolve, causing supersaturation, which results in the growth of purer potassium chloride on the seed crystals. Because the liquor in the slurry in digestive crystallizer 4 is not saturated with sodium chloride, the sodium chloride remains in solution. Although the concentration of sodium chloride in the liquor in digestive crystallizer 4 is below saturation, it is preferably very close to saturation in order to reduce the amount of water that subsequently must be evaporated. The sodium chloride concentration of the liquor in crystallizer 4 should be greater than about 50% of saturation, and it is preferably 85% to 99% of saturation. The residence time in the digestive crystallizer is not critical and a typical residence time is about ½ to about 10 hours. The temperature also is not critical and the digestive crystallizer is typically operated at a temperature of about ambient to about 110° C.

The solids content of the slurry in digestive crystallizer 4 is within the range of 20 to 60 percent settled solids by volume. (The term "solids content" means the level to which solids in a slurry sample withdrawn from the crystallizer body will settle when placed in a graduated cylinder. Thus, if a 1000 ml sample of slurry is withdrawn from a crystallizer and placed in a 1000 ml graduated cylinder, and if the solids settle to a level up to the 400 ml mark the solids content is considered to be 40 percent by volume.) If the solids content is below about 20 percent, the reduced total surface of the growing crystals slows the digestion process, and the production rate is reduced. On the other hand, if the solids content is above about 60%, it becomes difficult to maintain proper circulation within the digestive crystallizer.

A portion of the aqueous phase in the digestive crystallizer (i.e., the mother liquor) is sent through line 3 to be used to form the slurry in wet grinder 2, and another portion is sent through line 6 to treater 7. Sodium carbonate or potassium carbonate introduced through line 8 is added to the liquor in treater 7 to precipitate magnesium and calcium. Insoluble slimes also settle out in the treater and are removed with the precipitates through line 9. A portion of clear mother liquor from treater 7 is returned to the digestive crystallizer through line 10.

A second portion of clear mother liquor from treater 7 passes through line 11 to evaporator 12 where water is evaporated forming steam which is removed through line 13. If useful steam is desired, evaporator 12 can be operated under pressure. Since potassium chloride is more soluble at higher temperatures while the solubility of sodium chloride remains about the same, the evaporation of water results in the precipitation of sodium chloride, which is removed through line 14. Under steady state conditions, the flow rate of sodium chloride in line 11 to evaporator 12 must be great enough so that the sodium chloride removed in line 14 is equal to the sodium chloride added to the system in line 1. The remaining liquor passes through line 15 where makeup water in line 16 is added to it before it is recycled to digestive crystallizer 4. The flow rate of the makeup water in line 16 must be great enough so that the potassium chloride does not crystallize out in line 15 and the sodium chloride concentration in the digestive crystallizer is maintained below saturation.

A portion of digestive crystallizer 4 consists of a means for separating particles according to particle size, preferably an elutriating column. The larger particles, which are the purer digestively crystallized potassium chloride product, are removed through line 17. Under steady state conditions, the amount of product crystals removed in line 17 should equal the amount of product crystals being formed in digestive crystallizer 4. Under optimal steady state conditions, the product crystals from the process of this invention will be of industrial grade purity.

If still higher purity is desired, the process can be repeated using the product potassium chloride in line 17. The product potassium chloride slurry in line 17 is then sent to wet grinder 18 where it is again ground to form feed crystals having a particle size of about 0.1 to about 50 microns average diameter, preferably about 1 to about 25 microns average diameter. Again, the crystals have a wide distribution so that the average diameter of the feed crystals is about 10 to about 1000 times smaller than the average diameter of the product crystals.

The ground feed slurry is then sent through line 19 to the second stage digestive crystallizer 20, which is similar to digestive crystallizer 4. Again, the smaller crystals dissolve causing potassium chloride supersaturation which results in the growth of a higher purity potassium chloride on the larger crystals. However, unlike the conditions in digestive crystallizer 4, the concentration of sodium chloride in digestive crystallizer 20 is much lower and is controlled at a level below 20% of saturation. Makeup water in line 21 is added to digestive crystallizer 20 and the sodium chloride concentration in digestive crystallizer 20 is kept below 20 percent of saturation by recycling the mother liquor through line 22 back to digestive crystallizer 4. The solids content of the slurry in digestive crystallizer 20 should be controlled at a level similar to that in digestive crystallizer 4.

An elutriating column (or other means of separating particles according to particle size), which is part of digestive crystallizer 20, separates out the larger product crystals which are removed through line 23. (Under steady state conditions, the amount of potassium chloride removed in line 23 should be only slightly less than the amount of product potassium chloride delivered to wet grinder 18.) It is believed that by this recrystallization process with the output in line 19 as the feed, industrial grade potassium chloride can be purified to chemical grade potassium chloride.

Start-up of the process can be accomplished in several ways. For example, the feed crystals can be used to provide the seed crystals on which crystal growth will occur. If this is done, the initial product crystals removed from the crystallizers will be less pure. They can be reground and recycled if desired until equilibrium has been reached and a purer product is obtained. Alternatively, pure seed crystals can be added to the crystallizer at start-up so that the product crystals removed from the crystallizer will be at the maximum obtainable purity initially.

The above description is for the continuous steady state operation of the process of this invention, but the process of this invention can also be operated as a batch process. However, a continuous process is preferred because it is more efficient, lower cost, produces a purer product, and requires less capital expenditure.

The following example further illustrates this invention.

EXAMPLE

This example illustrates a batch process which demonstrates that the digestive crystallization process of this invention purifies potassium chloride.

In a Morton flask fitted with an electric stirrer and a thermometer and surrounded by an 80° C. constant temperature water bath, 142 grams of reagent grade potassium chloride and 107 grams of reagent grade sodium chloride were dissolved in 450 ml of water. The resulting solution at 80° C. was 85.5% saturated with sodium chloride and 98.6% saturated with potassium chloride.

Dried potassium chloride product from a previous experiment was screened to yield a supply of seed crystals passing 70 mesh and retained on 200 mesh screens. The sodium chloride content of this seed potassium chloride was 0.46 percent. There was also prepared a supply of agricultural grade feed material. This had been ground to a fine powder and screened to pass 200 mesh. The sodium chloride content of this feed material was 2.92 percent.

To start the digestive crystallization, 60 grams of the seed crystals were added to the solution in the Morton flask, and the resulting slurry was stirred until the temperature returned to 80° C. During this period of stirring while the temperature rose back to 80° C., about 2 grams of the seed material dissolved, bringing the potassium chloride concentration fully to saturation (about 32.0 grams of potassium chloride per 100 grams of water). Every ten minutes over the next 3 hours, a 10 gram portion of feed material was added to the slurry—190 grams of feed material in all. The feed was added in this manner to simulate in some degree a continuous feed of the finely ground agricultural grade potassium chloride.

Stirring at 80° C. was continued for three hours after the last feed addition. The stirrer was then shut off and the mother liquor was sucked off through a fritted glass sparging tube into a suction flask. The volume of mother liquor withdrawn was then measured. The Morton flask was removed from the water bath and a volume of room temperature saturated sodium free potassium chloride solution equal to the volume of mother liquor withdrawn was added. The stirrer was started and the slurry was cooled rapidly to room temperature. The slurry was next poured into a one liter graduated cylinder where the settled solids were determined to be 43.3 percent by volume.

The slurry was then transferred to a fritted glass funnel where the aqueous phase was drawn off. To remove the sodium in the aqueous phase wetting the crystals, the wet cake in the filter was washed twice more with sufficient room temperature saturated pure potassium chloride solution to displace the air from within the filter cake. After each wash, the wash solution was sucked through the filter. Finally, the saturated potassium chloride solution wetting the filter cake was washed away by repeating the washing procedure three times using isopropanol in place of the aqueous potassium chloride wash solution. The washed potassium chloride was dried by continuously sucking dry nitrogen through the filter until the isopropanol and any traces of water had evaporated. The weight of the dried solid was found to be essentially equal to the 250 grams of solids charged to the Morton flask. The recovered solids were blended and samples were tested for particle size distribution and the concentrations of sodium, calcium, and magnesium were determined.

The particle size distribution of the charged solids and of the digestively crystallized solids are compared below:

| Percent of Charged Solids | Percent Retained | Percent of Digested Solids |
| --- | --- | --- |
| 0 | on 50 mesh | 0 |
| 0 | through 50 on 70 mesh | 1.5 |
| 10 | through 70 on 100 mesh | 33.2 |
| 14 | through 100 on 200 mesh | 63.4 |
| 76 | through 200 mesh | 1.9 |

In this experiment the digestive crystallization process has resulted in a large increase in average particle size. The most dramatic change is the increase from 24 percent to 98.1 percent in the fraction retained on a 200 mesh sieve. The increase in the fraction retained on the 100 mesh sieve from 10 percent to 34.7 percent is an excellent indication that the process will yield satisfactory average crystal size when operated in industrial scale equipment.

A comparison of the sodium, calcium, and magnesium impurities in the charged solids and the digested solids follows:

| | Percent NaCl | PPM Ca | PPM Mg |
| --- | --- | --- | --- |
| Charged solids | 2.33 | 449 | 1098 |
| Digestively crystallized solids | 0.37 | 90 | 400 |

Clearly, the digestive crystallization process of this rather crude batch laboratory equipment resulted in major improvement in purity of the charged potassium chloride. The continuous process outlined in the accompanying drawing will provide far better control for optimization of seed slurry concentration, particle size of feed, rate of feed addition and particle size of product. Such a process in industrial scale equipment is expected to result in significant improvements in purity over that demonstrated in the simple laboratory experiment described above.

I claim:

1. A method of reducing the sodium chloride content of potassium chloride comprising
    (1) forming an aqueous slurry of potassium chloride feed crystals having a wide particle size distribution with an average diameter of about 0.1 to about 50 microns in a liquor saturated with potassium chloride and undersaturated with sodium chloride, but which is at least 50% saturated with sodium chloride, whereby the smaller of said feed crystals dissolve and potassium chloride grows on the larger of said feed crystals to form product crystals potassium chloride product crystals which have a lower sodium chloride content than said feed crystals and which have an average diameter about 10 to about 1000 times greater than the average diameter of said feed crystals; and (2) removing said product crystals from said slurry.

2. A method according to claim 1 wherein said sodium chloride content of said feed crystals is about 0.3 to about 10% by weight, based on crystal weight.

3. A method according to claim 1 wherein said slurry is about 85 to about 99% saturated with sodium chloride.

4. A method according to claim 1 wherein said feed crystals have an average particle size of about 1 to about 25 microns.

5. A method according to claim 1 wherein said feed crystals are formed from agricultural grade potassium chloride.

6. A method according to claim 1 wherein said product crystals are continuously removed at about the same rate that they are formed.

7. A method of reducing the sodium chloride content in potassium chloride that contains about 0.3 to about 10% by weight sodium chloride comprising
   (1) forming an aqueous slurry with said potassium chloride;
   (2) grinding said potassium chloride in said slurry to form feed crystals having a wide particle size distribution with an average diameter of about 0.1 to about 50 microns;
   (3) transferring said slurry to a digestive crystallizer;
   (4) maintaining the sodium chloride concentration of the liquor of said slurry at about 85 to about 99% of saturation and the potassium chloride concentration of said liquor at saturation, whereby the smaller of said feed crystals dissolve and the larger of said feed crystals grow to form product crystals; and
   (5) removing product crystals from said digestive crystallizer.

8. A method according to claim 7 wherein the amount of said product crystals removed from said digestive crystallizer is about equal to the amount of said product crystals that are formed in said digestive crystallizer.

9. A method according to claim 7 wherein said slurry in said digestive crystallizer is about 20 to about 60% settled solids by volume.

10. A method according to claim 7 including the additional step of decanting liquor from said digestive crystallizer.

11. A method according to claim 10 including using a portion of said decanted liquor to form said slurry.

12. A method according to claim 10 including adding sodium or potassium carbonate to a portion of said decanted liquor to precipitate calcium and magnesium.

13. A method according to claim 10 including heating a portion of said decanted liquor to evaporate water and precipitate sodium chloride.

14. A continuous process for increasing the purity of potassium chloride by reducing the concentration of sodium chloride therein comprising
   (1) preparing a first slurry of crystals of said potassium chloride;
   (2) grinding crystals in said first slurry to form feed crystals having a wide particle size distribution with an average diameter of about 0.1 to about 50 microns;
   (3) transferring said feed crystals to a first digestive crystallizer;
   (4) maintaining the sodium chloride concentration of the liquor in said first digestive crystallizer at about 85 to about 99% of saturation and the potassium chloride concentration of the liquor in said first digestive crystallizer at saturation, whereby the smaller of said feed crystals dissolve and potassium chloride of lower sodium chloride content than said feed crystals grows on the larger of said feed crystals to form intermediate product crystals; and
   (5) using a first portion of mother liquor from said digestive crystallizer to from said first slurry in step (1);
   (6) adding carbonate to a second portion of said mother liquor to precipitate magnesium and calcium therefrom;
   (7) heating a fraction of said portion of said mother liquor from step (6) to evaporate part of the water therefrom and precipitate sodium chloride;
   (8) returning said second portion of said mother liquor from step (7) to said first digestive crystallizer;
   (9) removing the larger of said intermediate product crystals from said first digestive crystallizer in an amount approximately equal to the amount of said intermediate product crystals being formed in said first digestive crystallizer;
   (10) forming a second aqueous slurry of said removed intermediate product crystals;
   (11) grinding said removed intermediate product crystals in said second slurry to a wide particle size distribution with an average diameter of about 0.1 to about 50 microns;
   (12) transferring said second slurry containing said ground intermediate product crystals to a second digestive crystallizer;
   (13) maintaining the concentration of potassium chloride in the liquor in said second digestive crystallizer at saturation and the concentration of sodium chloride in the liquor in said second digestive crystallizer at less than 20% of saturation, whereby the smaller of said intermediate product crystals dissolve and potassium chloride of lower sodium chloride content than said intermediate product crystals grows on the larger of said intermediate product crystals to form final product crystals; and
   (14) removing said final product crystals from said second digestive crystallizer in an amount approximately equal to the amount of said final product crystals being formed in said second digestive crystallizer.

15. A process according to claim 14 wherein the sodium chloride content of said potassium chloride crystals is about 0.3 to about 10% by weight, based on crystal weight.

16. A process according to claim 14 wherein said feed crystals have an average particle size of about 1 to about 25 microns.

17. A method according to claim 14 wherein said potassium chloride is agricultural grade potassium chloride.

18. A method according to claim 1 wherein said feed crystals are not compacted.

19. A method according to claim 1 wherein the smaller of said feed crystals are seed crystals and the average diameter of said product crystals is about 3 to about 100 times the average diameter of said seed crystals.

20. A method according to claim 1 wherein step 2 occurs over a period of about ½ to about 10 hours.

21. A method according to claim 1 wherein the temperature of said slurry is about ambient to about 110° C.

22. A method according to claim 1 wherein the solids content of said slurry is about 20 to about 60 percent settled solids by volume.

23. A method according to claim 1 which is continuous.

24. A method according to claim 1 wherein said product crystals are about 10 to about 1000 times larger in average diameter than said feed crystals.

25. A method according to claim 7 wherein said product crystals are about 10 to about 1000 times larger in average diameter than said feed crystals.

26. A method according to claim 7 wherein said feed crystals are not compacted.

27. A method according to claim 14 wherein said feed crystals are not compacted.

* * * * *

UNITED STATES PATENT AND TRADEMARK OFFICE
CERTIFICATE OF CORRECTION

PATENT NO. : 4,997,637

DATED : March 5, 1991

INVENTOR(S) : Lewis E. Tufts

It is certified that error appears in the above-identified patent and that said Letters Patent is hereby corrected as shown below:

Claim 1, lines 12 to 16, delete "potassium chloride product crystals which have a lower sodium chloride content than said feed crystals and which have an average diameter about 10 to about 1000 times greater than the average diameter of said feed crystals"

Claim 14, line 27, after "(7) heating a fraction of said" insert -- second --.

Signed and Sealed this

Fourteenth Day of July, 1992

Attest:

DOUGLAS B. COMER

Attesting Officer

Acting Commissioner of Patents and Trademarks